United States Patent
Denson et al.

(10) Patent No.: US 10,358,078 B2
(45) Date of Patent: Jul. 23, 2019

(54) ASSEMBLIES FOR ILLUMINATING CHAIN SLOTS ON A TRAILER

(71) Applicant: Fontaine Commercial Trailer, Inc., Springville, AL (US)

(72) Inventors: John Clifford Denson, Birmingham, AL (US); Gregory C. Benson, Pell City, AL (US)

(73) Assignee: Fontaine Commercial Trailer, Inc., Springville, AL (US)

( * ) Notice: Subject to any disclaimer, the term of this patent is extended or adjusted under 35 U.S.C. 154(b) by 409 days.

(21) Appl. No.: 15/357,372

(22) Filed: Nov. 21, 2016

(65) Prior Publication Data
US 2018/0141485 A1    May 24, 2018

(51) Int. Cl.
| | |
|---|---|
| *B60Q 1/26* | (2006.01) |
| *B60Q 1/24* | (2006.01) |
| *B23B 11/00* | (2006.01) |
| *B60Q 1/00* | (2006.01) |
| *F21S 43/19* | (2018.01) |
| *B60Q 1/30* | (2006.01) |
| *B60Q 1/50* | (2006.01) |
| *B60P 7/08* | (2006.01) |
| *B65D 85/42* | (2006.01) |

(52) U.S. Cl.
CPC ............. *B60Q 1/0005* (2013.01); *B60Q 1/24* (2013.01); *B60Q 1/2649* (2013.01); *B60Q 1/2696* (2013.01); *B60Q 1/305* (2013.01); *B60Q 1/50* (2013.01); *F21S 43/19* (2018.01); *B60P 7/0807* (2013.01); *B65D 85/42* (2013.01); *Y10T 29/49959* (2015.01)

(58) Field of Classification Search
CPC ...... F21S 43/19; F21S 43/195; B60Q 1/0005; B60Q 1/2649; B60Q 1/2696; B60Q 1/305; B60Q 1/307; B60Q 1/50; B60Q 1/24; B60P 7/0807; B60P 1/4464; B65D 85/42; B65D 85/68; Y10T 29/49948; Y10T 29/49959; Y10T 29/49961; Y10T 29/49966
USPC ............... 280/204, 407.1; 362/485; 206/573; 29/525.08, 525.09, 525.13
See application file for complete search history.

(56) References Cited

U.S. PATENT DOCUMENTS

| | | | |
|---|---|---|---|
| 3,751,105 A | * | 8/1973 | Norman ............... B62D 27/023 296/184.1 |
| 6,198,386 B1 | | 3/2001 | White, II |
| 6,238,068 B1 | | 5/2001 | Farmer, Jr. |

(Continued)

*Primary Examiner* — Alan B Cariaso
(74) *Attorney, Agent, or Firm* — Andrus Intellectual Property Law, LLP

(57) ABSTRACT

A kit for illuminating chain slots on a trailer includes a plurality of brackets, each having a first arm and a second arm. The second arm is oriented at an angle to the first arm and has a mounting area. A tool is provided for positioning a bracket adjacent a respective chain slot on the trailer and for holding the bracket in place adjacent the chain slot until the bracket is attached to the trailer. The tool has a portion configured to engage with the mounting area of the bracket. Lights are also provided, each light configured to be attached to a respective mounting area of the bracket after the bracket has been attached to the trailer and the portion of the tool has been disengaged from the mounting area. An electrical conductor is configured to connect the plurality of lights to an electrical wiring harness of the trailer.

20 Claims, 8 Drawing Sheets

(56) References Cited

U.S. PATENT DOCUMENTS

| | | | |
|---|---|---|---|
| 6,921,184 B2 | 7/2005 | Tufte | |
| 8,061,881 B2 * | 11/2011 | Weitzel | B60Q 1/323 |
| | | | 362/276 |
| 8,701,265 B1 * | 4/2014 | James | B64C 1/20 |
| | | | 24/297 |
| 9,056,580 B2 | 6/2015 | Baldsiefen et al. | |
| 9,132,770 B2 * | 9/2015 | Amsley | B60Q 1/32 |
| 9,150,152 B2 | 10/2015 | Sura et al. | |
| 9,267,659 B2 * | 2/2016 | Lee | F21S 41/192 |
| 10,029,611 B2 * | 7/2018 | Harris | F21S 45/50 |
| 2006/0260966 A1 * | 11/2006 | Lake | B65D 81/113 |
| | | | 206/419 |
| 2009/0109696 A1 | 4/2009 | Lembrick et al. | |
| 2012/0268960 A1 * | 10/2012 | Kiser | B60Q 1/22 |
| | | | 362/485 |
| 2015/0217685 A1 | 8/2015 | Salter et al. | |
| 2016/0090234 A1 * | 3/2016 | Ronstadt | B65D 90/0086 |
| | | | 414/802 |
| 2018/0029656 A1 * | 2/2018 | Barnes | B62D 63/08 |

* cited by examiner

ASSEMBLIES FOR ILLUMINATING CHAIN SLOTS ON A TRAILER

FIELD

The present disclosure relates to trailer apparatuses for transporting machinery, goods, equipment, and general cargo.

BACKGROUND

Trailers may be provided with chain slots along either lateral edge of the trailer deck and/or running longitudinally down center areas of the deck. These chain slots are configured to receive hooks, chain links, or other types of straps that can be used to secure cargo to the trailer deck. For example, a hook on the end of a chain can be placed in a chain slot on a first lateral side of the deck, the chain can be crossed over the load, and a hook on the other side of the chain can be hooked into a chain slot on the other lateral side of the deck. Often such chain slots are formed in the structural support beams of the trailer, in order that the hooks pull against material that is strong enough to provide resistive force to any movement of the load that might occur while the truck is moving.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example, the present disclosure relates to a kit for illuminating chain slots on a trailer. The kit includes a plurality of brackets, each bracket in the plurality of brackets having a first arm and a second arm, the second arm being oriented at an angle to the first arm and having a mounting area. A tool is provided for positioning a respective bracket in the plurality of brackets adjacent a respective chain slot on the trailer and for holding the bracket in place adjacent the chain slot until the bracket is attached to the trailer, the tool having a portion configured to engage with the mounting area of the bracket. Also provided is a plurality of lights, each light in the plurality of lights configured to be attached to a respective mounting area of the bracket after the bracket has been attached to the trailer and the portion of the tool has been disengaged from the mounting area. An electrical conductor is configured to connect the plurality of lights to an electrical wiring harness of the trailer.

According to another method of the present disclosure, a method for illuminating chain slots on a trailer is provided. The method includes providing a plurality of brackets, each bracket in the plurality of brackets having a first arm and a second arm, the second arm having a mounting area. Each bracket is attached adjacent a respective chain slot on the trailer, such that the first arm of each bracket extends generally horizontally and is attached to an underside of the trailer, and the second arm of each bracket is angled toward the respective chain slot. The method then includes providing a plurality of lights and attaching each light in the plurality of lights to a respective mounting area of a respective bracket. The plurality of lights is electrically connected to an electrical wiring harness of the trailer.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
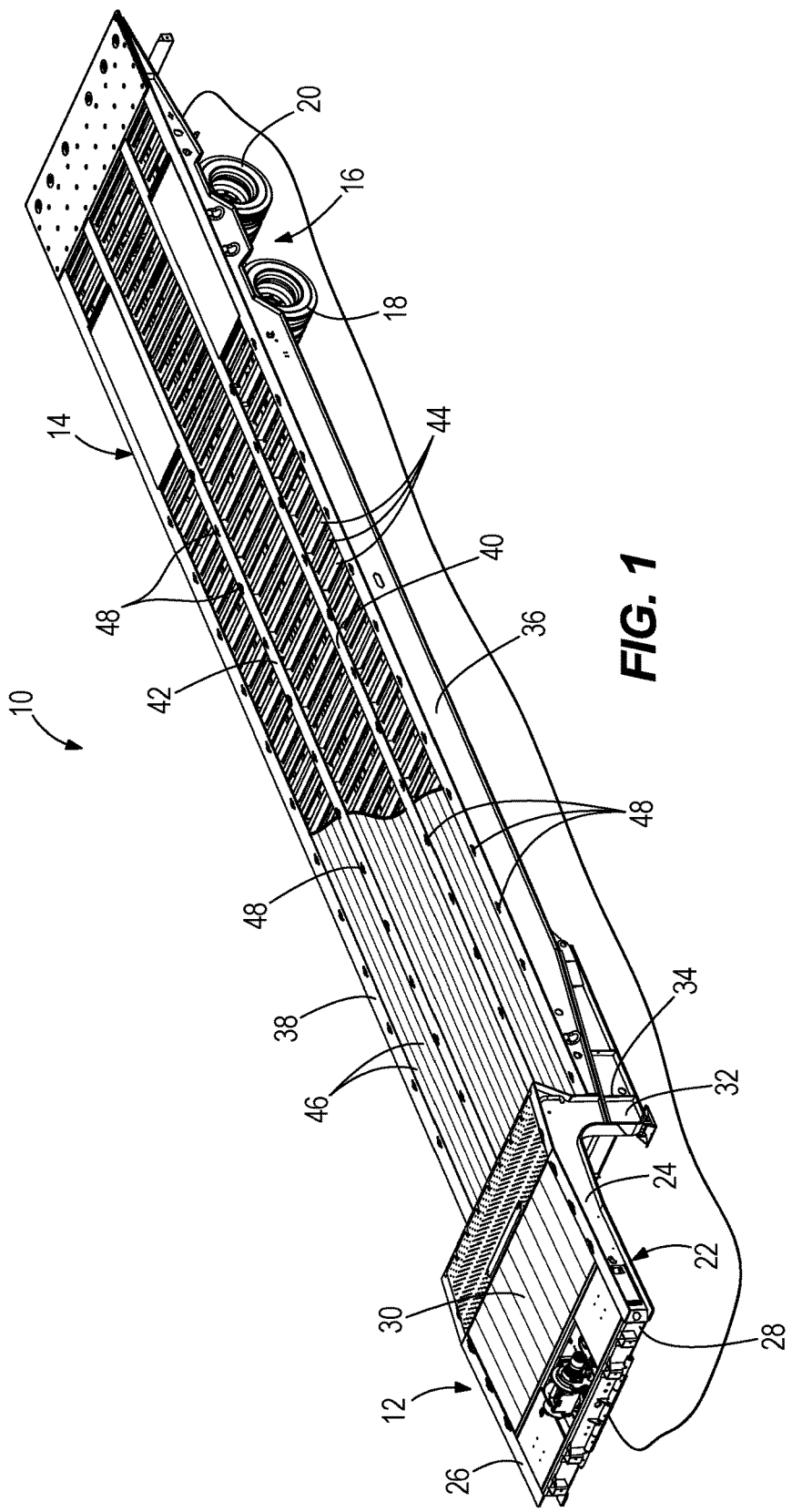
FIG. 1 illustrates one example of a trailer.

Referring to FIG. 1 of the drawings, one example of a trailer 10 generally comprises an upper deck 12 and a main deck 14, although it should be understood that fewer or more decks, in configurations other than that shown herein, could be provided. A wheeled undercarriage 16 is secured beneath a rearward end of the main deck 14, and provides support for the trailer 10 during transport, loading, and unloading thereof. The undercarriage 16 is constructed with axles, a set of front and rear wheels 18, 20, respectively, and suspension assemblies for enabling cushioning and shock absorbing of the trailer 10, as is known. Also as is known, the upper deck 12 is configured to be attached to a truck by way of a kingpin assembly, for hauling of the trailer 10 behind the truck.

The upper deck 12 includes an upper deck frame 22 having side beams 24, 26 which extend rearwardly from a front end 28 thereof for supporting an upper loading surface 30. The side beams 24, 26 are formed with downwardly extending rear portions, only one of which is shown at 32. The rear portion 32 of the side beam 24 is integrally connected to a forward end 34 of a longitudinally extending main support beam 36. Likewise, the rear portion (not shown) of the side beam 26 is integrally connected to a forward end (not shown) of a longitudinally extending main support beam 38 on the opposite side of the trailer 10. Additional longitudinally extending center support beams 40, 42 are provided between the main support beams 36, 38. The support beams 36, 40; the support beams 40, 42; and the support beams 42, 38 are each respectively connected by a number of laterally extending cross-members 44. Longitudinally extending deck planks 46 are located between each pair of support beams 36, 40; 40, 42; and 42, 38 and are supported by the cross-members 44. While the support beams 36, 38, 40, 42 and cross-members 44 are made of steel or aluminum, the deck planks 46 are made of wood, composite, or aluminum. Note that other configurations of support beams, cross-members, and deck members can be used, and the trailer 10 show herein is merely for exemplary purposes.

Figure 2:
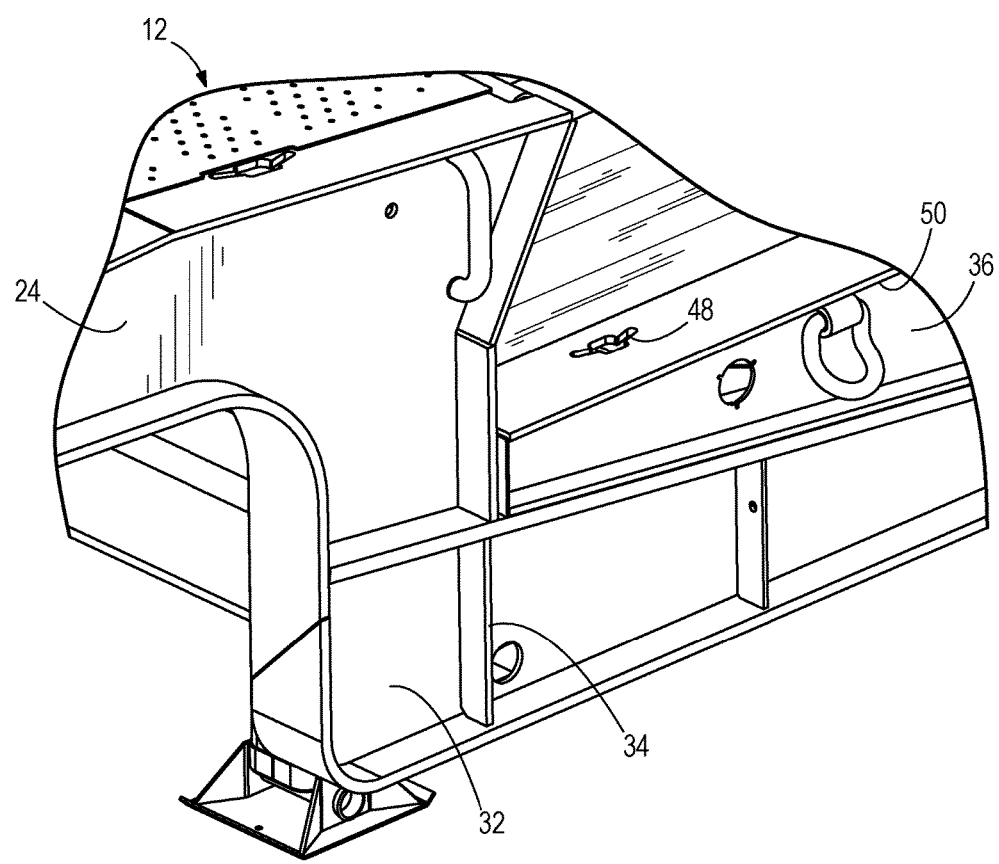
FIG. 2 illustrates a fore portion of the trailer of FIG. 1.

As can be seen on each of the support beams 36, 38, 40, 42, chain slots 48 are provided for anchoring hooks on chains or other types of straps that will hold a load to the main deck 14. Although many chain slots are shown, a few are called out for exemplary purposes at reference numbers 48. FIG. 2 illustrates a close-up view of one of the chain slots 48. As can be seen, the chain slot 48 is provided in an upper flange 50 of the main support beam 36. The chain slot 48 extends all the way through the upper flange 50, such that a hook is able to be extended through the chain slot 48 and anchored by way of engagement with the bottom surface of the upper flange 50. Note that the chain slots 48 provided on support beams 38, 40, and 42 are also provided in upper flanges 50 of those beams, in the same way as they are shown in the upper flange 50 shown in FIG. 2. Note that the chain slots 48 could be configured other than the shape shown herein, which is for exemplary purposes only.

When a trailer is being loaded during foggy, rainy, semi-dark, or dark conditions, it is difficult to see the edges of the trailer, and even more difficult to see the chain slots 48 formed in the upper flanges 50 of the support beams 36, 38, 40, 42. Thus, the present inventors have developed a kit and an accompanying method for illuminating the chain slots 48 on a trailer 10. All of the chain slots 48 on the trailer 10 can be illuminated, only the chain slots 48 on the two main support beams 36, 38 can be illuminated, or only the chain slots 48 on the support beams 40, 42 can be illuminated. Every chain slot 48 in a longitudinal line can be illuminated, every other chain slot 48 can be illuminated, or the chain slots in a longitudinal line can be illuminated in varying patterns. For example, the chain slots 48 can be illuminated to blink in sequence to indicate loading direction along the length of the trailer, such as from back to front. The kit of the present disclosure is meant to be used with any type of chain slot on any trailer, and therefore the person who is installing illumination devices on the trailer can choose where and how many chain slots to illuminate.

Figure 3:
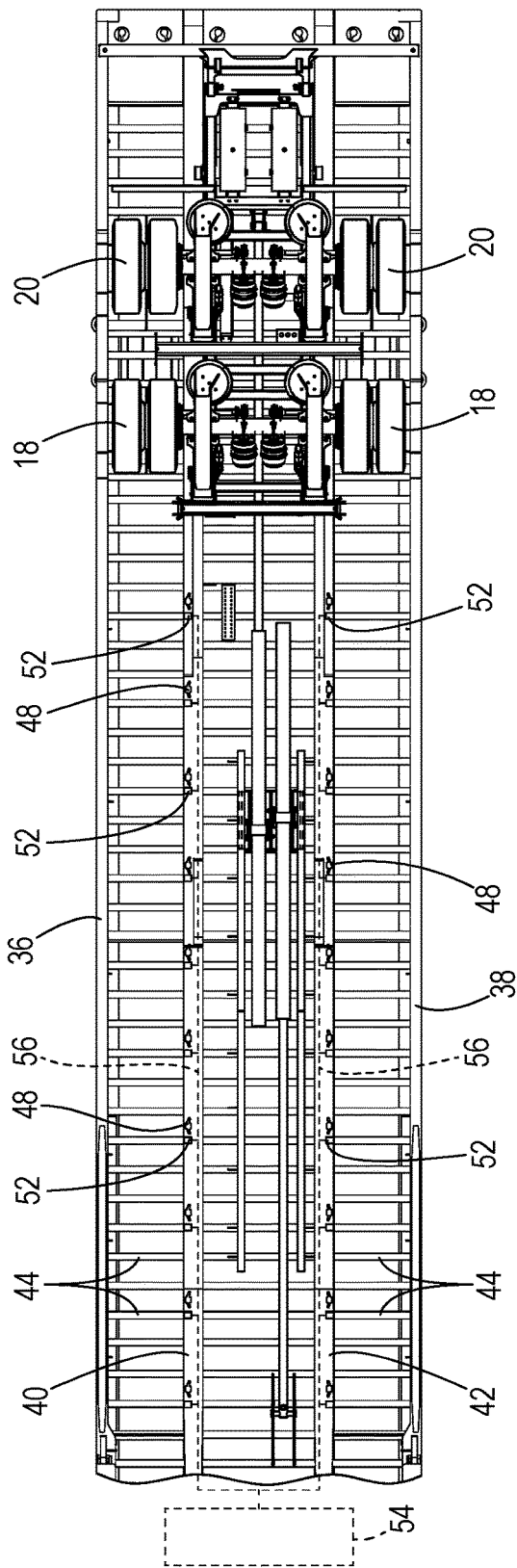
FIG. 3 illustrates an underside of the trailer of FIG. 1.
Figure 4:
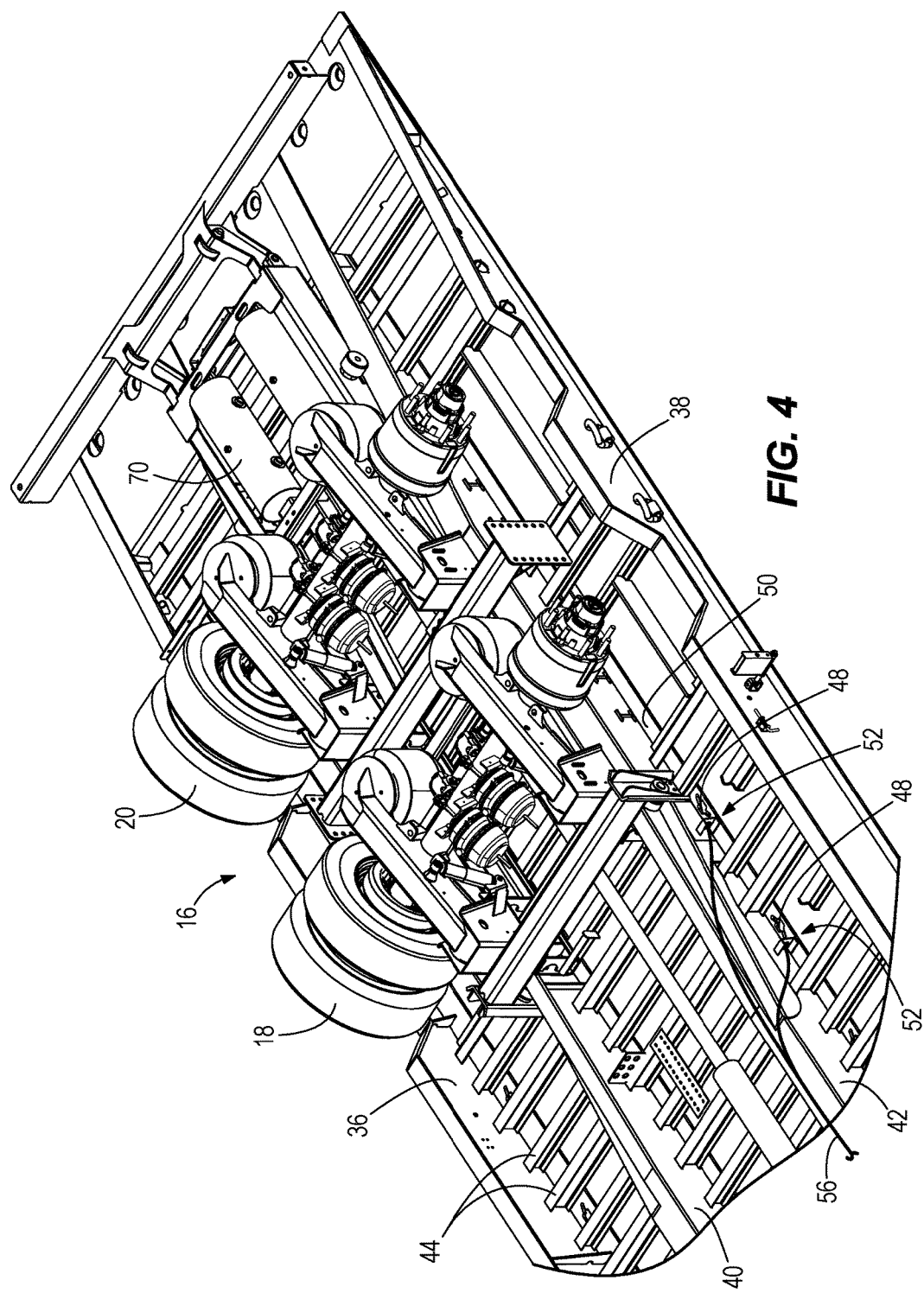
FIG. 4 illustrates a more detailed view of a portion of the underside of the trailer of FIG. 1.

As shown in FIGS. 3 and 4, illumination of the chain slots 48 can be accomplished by providing a plurality of bracket and light assemblies 52, each bracket and light assembly 52 associated with a respective chain slot 48 that is to be illuminated. Each of the brackets in the bracket and light assemblies 52 can be connected to the trailer 10, such as to the underside of the support beam in which a given chain slot is located. In the example of FIG. 3, the bracket and light assemblies 52 are provided on the underside of the upper flanges 50 of the support beams 40, 42, although it should be understood that bracket and light assemblies 52 could also or alternatively be provided on support beams 36, 38. Each of the plurality of lights in the bracket and light assemblies 52 can be electrically connected to one another and to an electrical wiring harness 54 of the trailer. Such connection is shown schematically by way of electrical connectors 56, but it should be understood that such electrical connection can be made by way of any arrangement of electrical connectors known to those having ordinary skill in the art. The lights in the bracket and light assemblies 52 can be connected to a power source, preferably in a parallel configuration such that each light can operate even when one or more of the remaining lights burns out or otherwise becomes damaged. The power source may be any type of power source, but is preferably a battery of the truck pulling the trailer 10. The lights can be connected to the power source by way of the wiring harness 54. One or more switches can control acti-vation of the lights, which switches can be electrical relays or manually-actuated switches, for example accessible from the truck. The one or more switches could be a separate switch that controls only the lights that illuminate the chain slots 48, a switch that controls the chain slot lights in combination with other auxiliary light systems on the trailer 10, or a switch that automatically turns on when the truck's parking lights are illuminated. For example, the switch could be tied with the parking light circuit of the electrical wiring harness 54 so that whenever the truck and trailer 10 are stationary and the truck is in "park," the lights are illuminated. The lights could even be lit during transit of the trailer 10, although their illumination during transit is not necessary.

In FIG. 4, two exemplary bracket and light assemblies 52 are shown as being attached to an underside of the upper flange 50 of the support beam 42. The bracket and light assemblies 52 are shown with schematic electrical connectors 56 extending down the support beam 42 as shown herein, and attached thereto by way of clips or similar connectors, although such attachment is not shown herein. Note that portions of the lateral cross-members 44 have been removed in FIG. 4 in order to more clearly show the locations of the chain slots 48 and bracket and light assemblies 52.

Figure 5:
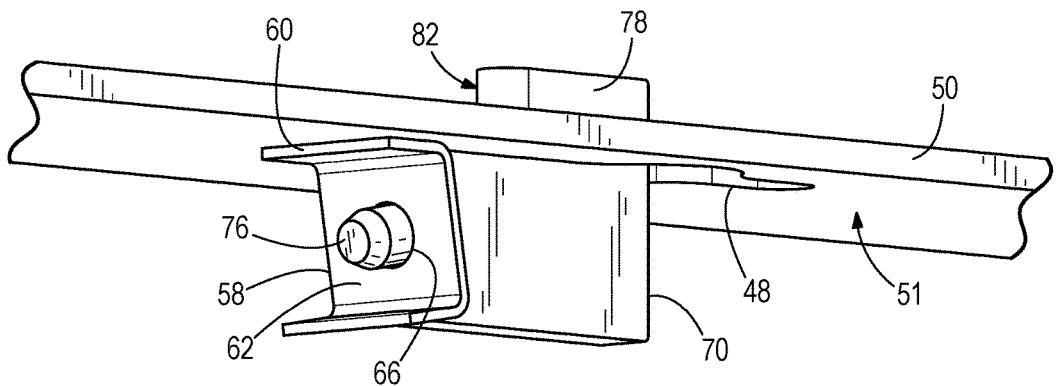
FIG. 5 illustrates one example of an installment tool and a bracket for providing a light for illuminating a chain slot on the trailer.
Figure 6:
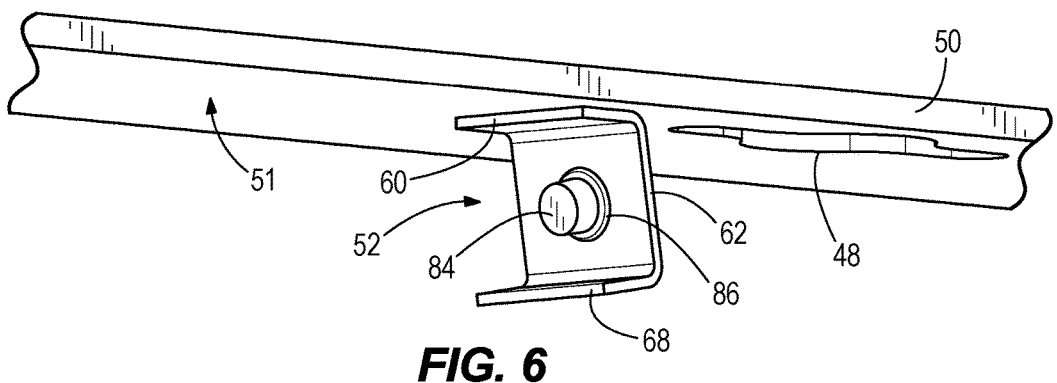
FIG. 6 illustrates one example of a bracket and light for illuminating a chain slot on the trailer.
Figure 7:
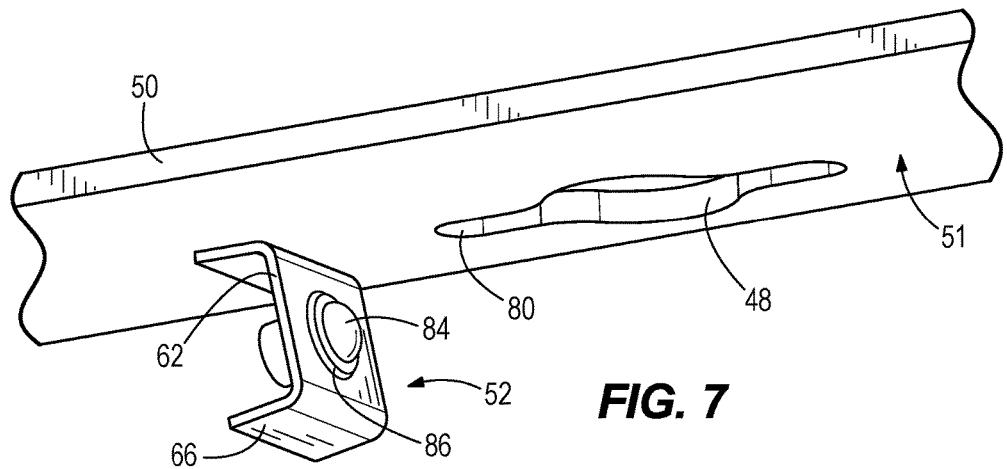
FIG. 7 illustrates another view of the bracket and light.
Figure 8:
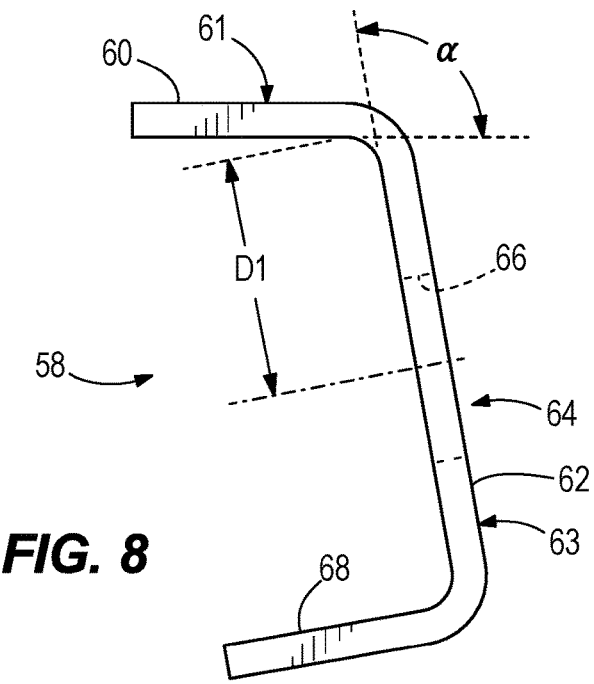
FIG. 8 illustrates a side view of the bracket.

FIGS. 5-9 will be referred to in order to describe how the bracket and light assemblies 52 are connected to the underside of the upper flange 50 of a support beam. Note that only the upper flange 50 of a given support beam is shown in FIGS. 5-7, in order to maintain clarity of the drawings. Note also that the upper flange 50 could be the upper flange of any of the support beams 36, 38, 40, 42 described herein above. According to the present disclosure, the kit for illuminating chain slots 48 on a trailer 10 may include a plurality of brackets 58, each bracket 58 in the plurality of brackets having a first arm 60 and a second arm 62, as shown in FIG. 8. The second arm 62 of each bracket 58 may be oriented at an angle (see angle α) to the first arm 60, and may include a mounting area 64. In one example, the mounting area 64 on each bracket 58 comprises an aperture 66 extending through the second arm 62 of the bracket 58. Note that other types of mounting areas could be provided, such as a hook, a depression, a notch, or any other type of socket for holding a light 84. If the mounting area 64 is an aperture, the aperture 66 may be cylindrical, as best shown in FIGS. 5-7. The bracket 58 may also include a third arm 68 that depends from the second arm 62 at a different angle than the angle α. In one example, both the first and third arms 60, 68 are shorter than the second arm 62. The third arm 68 can be provided on the bracket 58 in order to prevent the light 84 from being splashed by water or hit with debris from the roadway.

Figure 9:
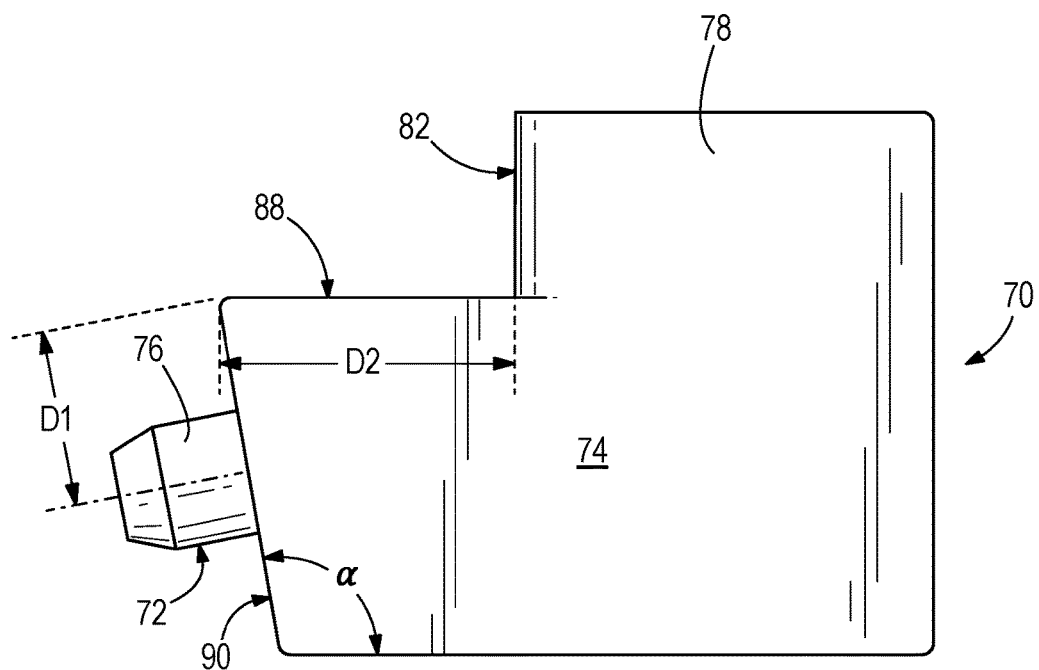
FIG. 9 illustrates a side view of the installment tool.

The kit may also include an installation tool 70, shown in FIGS. 5 and 9, for positioning a respective bracket 58 in the plurality of brackets adjacent a respective chain slot 48 on the trailer 10. As shown in FIG. 5, the tool 70 can be used to hold the bracket 58 in place adjacent the chain slot 48, and can remain in place until the bracket 58 is attached to the trailer 10. As shown in more detail from the side view provided in FIG. 9, the tool 70 has a portion 72 that is configured to engage with the mounting area 64 of the bracket 58. More specifically, the tool 70 comprises a body 74, and the portion 72 of the tool 70 configured to engage with the mounting area 64 of the bracket 58 comprises a protrusion 76 extending from the body 74 and shaped to fit through the aperture 66 in the second arm 62 of the bracket 58. (See FIG. 5.) Although the aperture 66 and protrusion 76 shown in FIGS. 5 and 9 are circular, the aperture 66 and protrusion 76 could take many other forms, and need not have the same shape as one another, so long as the protrusion 76 is capable of being inserted through the aperture 66 and held there in a relatively non-moveable manner unless force is applied, in order that the tool 70 can hold the bracket 58 adjacent the chain slot 48 while the bracket 58 is being installed. The tool 70 also includes a locating member 78 coupled to the body 74, more specifically to the top end of the body 74, and shaped to fit through the chain slot 48. For example, because the chain slot 48 in the present disclosure includes a rounded, semicircular groove 80 (FIG. 7), the locating member 78 may include a complimentary semicircular face 82 for insertion into the groove 80 and contact therewith. Of course, if the chain slot 48 has other shapes, the bracket 58 may have a locating member 78 that is shaped to match that of the chain slot 48. In other examples, the shape of the locating member 78 and that of the chain slot 48 do not match, but are such that contact between the two is facilitated in order to provide the desired spacing between the bracket 58 to be installed and the chain slot 48.

Referring to FIGS. 6 and 7, the kit may also include a plurality of lights 84, each light 84 in a plurality of lights configured to be attached to a respective mounting area 64 of the bracket 58 after the bracket 58 has been attached to the trailer 10 and the portion 72 of the tool 70 has been disengaged from the mounting area 64. The kit may also include a plurality of gaskets 86, each gasket 86 in the plurality of gaskets adapted to fit within a respective aperture 66 in a respective bracket 58 and to receive a respective light 84 therein. Not only do the gaskets 86 hold the lights 84 snugly within the apertures 66, the gaskets 86 also provide both electrical and heat insulation between the lights 84 and the brackets 58. As noted herein above, an electrical connector 56 is configured to connect the plurality of lights 84 to an electrical wiring harness 54 of the trailer 10.

To install a bracket 58 of a bracket and light assembly 52 near a given chain slot 48, the tool 70 may be used to provide correct relative placement between the bracket 58 and the chain slot 48. In one example, the bracket 58 may be placed on the tool 70 by inserting the protrusion 76 through the aperture 66, and then the tool 70 may be inserted in the chain slot 48 by way of the locating member 78. Alternatively, the tool 70 may first be placed in the chain slot 48 by way of the locating member 78, and then the bracket 58 may be provided on the tool 70 by pushing the aperture 66 around the protrusion 76. As shown in FIG. 5, the protrusion 76 is slid through the aperture 66 in the second arm 62 of a respective bracket 58 while the first arm 60 of the bracket 58 faces away from the tool body 74. This allows the tool body 74 to be placed through the respective chain slot 48 by way of the locating member 78 and a ledge 88 (FIG. 9) of the tool body 74 to be rested against the underside of the trailer 10, or more specifically against the underside 51 of the upper flange 50. The tool 70 can then be held in the chain slot 48 by the person installing the bracket and light assembly 52 until the bracket 58 has been attached to the upper flange 50.

Referring to FIGS. 5, 8, and 9, the depth D1 of the center axis of the protrusion 76 from the ledge 88 on the tool 70 and the depth D1 of the center axis of the aperture 66 from the first arm 60 of the bracket 58 are matched, such that a top surface 61 of the first arm 60 of the bracket 58 will also rest against the underside 51 of the upper flange 50 when the ledge 88 rests against the underside 51 of the upper flange 50. Note that the tool 70 also comprises an angled face 90 that depends from the ledge 88 and is configured to support an outer face 63 of the second arm 62 of the bracket 58 and to hold the bracket 58 in place until the bracket 58 is attached to the upper flange 50. The angle of the angled face 90 of the tool body 74 may match the angle α at which the second arm 62 of each bracket 58 is angled toward a respective chain slot 48 when each bracket 58 is attached to the underside of the trailer 10. This will ensure that the first arm 60 of each bracket 58 extends generally horizontally while it is attached to the underside of the trailer 10. Note also that a depth D2 of the ledge 88 is designed such that when the locating member 78 of the tool 70 is pushed all the way to one end of the chain slot 48, the bracket 58 will be positioned at a predetermined distance from the respective chain slot 48. Together, this distance D2 and the angle α of the second arm 62 of the bracket 58 are empirically determined to provide the optimal amount and angle of light through the chain slot 48, which may depend on the type of light 84 installed in the bracket 58.

To attach the first arm 60 of the bracket 58 to the underside 51 of the upper flange 50, welding and/or bolting may be employed. Specifically, the first arm 60 of the bracket 58 may be spot or line welded to the underside 51 of the upper flange 50 if both components are made of metal. Alternatively, a bolt hole or other fastener hole may be provided through the first arm 60 and a corresponding hole provided in the upper flange 50 for insertion of a fastener therethrough. After the first arm 60 of the bracket 58 is attached to the underside of the trailer 10, the tool 70 may be removed from the bracket 58 by removing the protrusion 76 from the aperture 66. The tool 70 may also be removed from the chain slot 48 by removing the locating member 78 therefrom. The bracket 58 will now remain in place on the underside of the upper flange 50 by way of the weld and/or fastener.

Next, a respective light 84 may be attached to the mounting area 64 of each bracket 58. This may be done by inserting the gasket 86 into the aperture 66 in the bracket 58 before inserting the light 84 into the aperture 66. Alternatively, the gasket 86 may first be placed around the light 84 and then both the gasket 86 and the light 84 may together be inserted into the aperture 66. Preferably, the lights 84 are low voltage, and may be light emitting diodes (LEDs) or incandescent lights. The bulbs of the lights are shaped such that they can be inserted through the gasket 86 and aperture 66 in the bracket 58.

Referring to FIGS. 6-8, as noted herein above, the first arm 60 of each bracket 58 extends generally horizontally when the first arm 60 is attached to the underside of the trailer 10. The second arm 62 of each bracket 58 extends downwardly from the first arm 60 at the angle α with respect to the first arm 60. In one example, the angle α is between about 70° and about 110°. In another example, the second arm 62 of each bracket 58 is angled toward the respective chain slot 48 when the first arm 6 is attached to the underside of the trailer 10. In this example, the second arm 62 of each bracket 58 extends at an angle of greater than 90° to about 110° with respect to the first arm 60.

Figure 10:
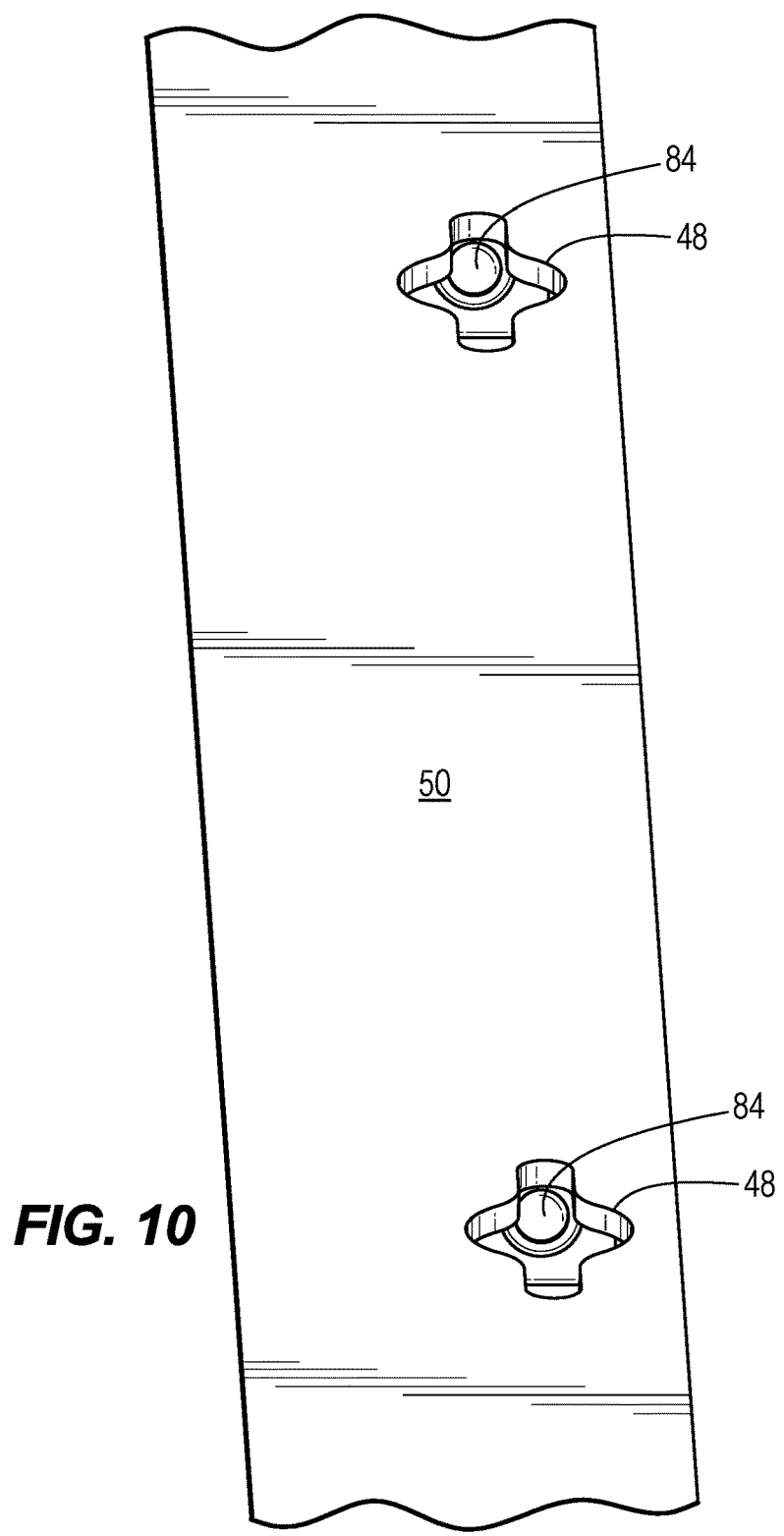
FIG. 10 illustrates a top view of a support beam of the trailer.

It may be desirable to place the bracket and light assemblies 52 in front of the chain slots 48 (see FIGS. 3 and 4), such that the light shining through each chain slot 48 is directed towards a rear of the trailer 10. This is shown in FIG. 10, which illustrates a top view of the upper flange 50 of a given support beam, and the lights 84 shining through the chain slots 48 shown therein. Alternative arrangements and anglings of the lights 84 could be provided in order to provide different effects for illumination of the chain slots 48. For example, the lights 84 could be provided directly below the chain slots 48 on a bracket surface that is parallel to the plane of the upper flange 50.

Figure 11:
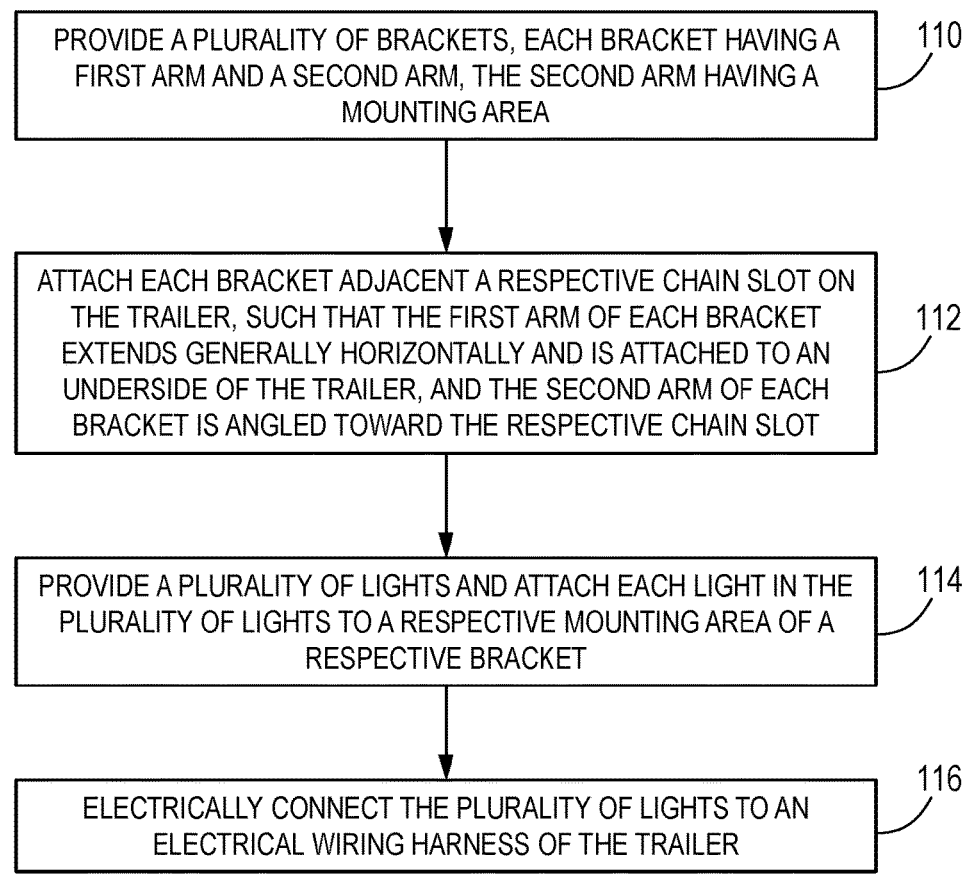
FIG. 11 illustrates a method according to the present disclosure for illuminating chain slots on a trailer.

FIG. 11 illustrates one example of a method for illuminating chain slots 48 on a trailer 10. The method includes, as shown at 110, providing a plurality of brackets 58, each bracket 58 in the plurality of brackets having a first arm 60 and a second arm 62, the second arm 62 having a mounting area 64. In one example, the mounting area 64 comprises a protrusion 76 on an angled face 90 of a body 74 of the tool 70. As shown at 112, the method may include attaching each bracket 58 in the plurality of brackets adjacent a respective chain slot 48 on the trailer 10, such that the first arm 60 of each bracket 58 extends generally horizontally and is attached to an underside 51 of the trailer, and the second arm 62 of each bracket 58 is angled toward the respective chain slot 48. The method may include, as shown at 114, providing a plurality of lights 84 and attaching each light 84 in the plurality of lights to a respective mounting area 64 of a respective bracket 58. Gaskets 86 may be provided around each of the lights 84 in order to hold them in the aperture 66 that defines the mounting area 64 of the bracket 58. The method also includes, as shown at 116, electrically connecting the plurality of lights 84 to an electrical wiring harness 54 of the trailer 10, such as by way of electrical connectors 56.

The kit and method of the present disclosure provide a durable and reliable illuminated path for orientation and alignment of vehicles or cargo being driven or loaded onto a trailer 10, as well as enhanced visibility of chain slots 48. This provides increased user efficiency at night or in inclement weather. Note that by way of the angled face 90 of the tool 70 and the angle of the second arm 62 with respect to the first arm 60 of the bracket 58, the lights 84 can be mounted at an appropriate angle so that maximum visual impact of the lights 84 is made on the person loading equipment or other cargo onto the trailer. The tool 70 can be reused for attachment of each bracket 58 and light 84 to the underside of the trailer 10. Additionally, by providing the brackets 58 under the upper flanges 50 of the support beams, it is ensured that the brackets 58 and lights 84 are not run over by a vehicle loaded on the main deck 14 or other cargo loaded on the main deck 14, but rather remain safely below the surface of the main deck 14.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A kit for illuminating chain slots on a trailer, the kit comprising:
   a plurality of brackets, each bracket in the plurality of brackets having a first arm and a second arm, the second arm being oriented at an angle to the first arm and having a mounting area;
   a tool for positioning a respective bracket in the plurality of brackets adjacent a respective chain slot on the trailer and for holding the bracket in place adjacent the chain slot until the bracket is attached to the trailer, the tool having a portion configured to engage with the mounting area of the bracket;
   a plurality of lights, each light in the plurality of lights configured to be attached to a respective mounting area of the respective bracket after the bracket has been attached to the trailer and the portion of the tool has been disengaged from the mounting area; and
   an electrical conductor configured to connect the plurality of lights to an electrical wiring harness of the trailer.

2. The kit of claim 1, wherein the mounting area on each bracket comprises an aperture extending through the second arm of the bracket.

3. The kit of claim 2, further comprising a plurality of gaskets, each gasket in the plurality of gaskets adapted to fit within a respective aperture in a respective bracket and to receive a respective light therein.

4. The kit of claim 2, wherein the tool comprises a body, and the portion of the tool configured to engage with the mounting area of the bracket comprises a protrusion extending from the body and shaped to fit through the aperture in the second arm of the bracket.

5. The kit of claim 4, wherein the tool further comprises a locating member coupled to the body and shaped to fit through the chain slot.

6. The kit of claim 1, wherein the first arm of each bracket is configured to be attached to an underside of the trailer adjacent the respective chain slot.

7. The kit of claim 6, wherein the first arm of each bracket extends generally horizontally when the first arm is attached to the underside of the trailer, the second arm of each bracket extends downwardly from the first arm at the angle to the first arm, and the angle is between about 70 degrees and about 110 degrees.

8. The kit of claim 7, wherein the second arm of each bracket is angled toward the respective chain slot when the first arm is attached to the underside of the trailer.

9. The kit of claim 8, wherein the tool comprises a body having an upwardly-extending locating member shaped to fit through the respective chain slot, a ledge configured to rest against the underside of the trailer while the locating member is positioned in the respective chain slot, and an angled face depending from the ledge and configured to support the second arm of the bracket while holding the bracket in place until the bracket is attached to the trailer.

10. The kit of claim 1, wherein the plurality of lights comprises light-emitting diodes.

11. A method for illuminating chain slots on a trailer, the method comprising:
    providing a plurality of brackets, each bracket in the plurality of brackets having a first arm and a second arm, the second arm having a mounting area;
    attaching each bracket adjacent a respective chain slot on the trailer, such that the first arm of each bracket extends generally horizontally and is attached to an underside of the trailer, and the second arm of each bracket is angled toward the respective chain slot;
    providing a plurality of lights and attaching each light in the plurality of lights to a respective mounting area of a respective bracket; and
    electrically connecting the plurality of lights to an electrical wiring harness of the trailer.

12. The method of claim 11, further comprising inserting each light through a respective aperture extending through the second arm of each bracket.

13. The method of claim 12, further comprising providing a plurality of gaskets, and inserting a respective gasket from the plurality of gaskets into the respective aperture before inserting the light into the aperture.

14. The method of claim 12, further comprising:
providing a tool comprising a body and a protrusion extending therefrom that is shaped to fit through the aperture in the second arm of each bracket and a locating member coupled thereto that is shaped to fit through each chain slot;
sliding the protrusion through the aperture in the second arm of a respective bracket while the first arm of the bracket faces away from the tool body;
positioning the locating member of the tool through the respective chain slot and resting a ledge of the tool body and the first arm of the bracket against the underside of the trailer; and
after attaching the first arm of the bracket to the underside of the trailer, removing the protrusion from the aperture and removing the locating member from the chain slot.

15. The method of claim 14, wherein the tool body comprises an angled face depending from the ledge and configured to support the second arm of the respective bracket and to hold the bracket in place until the bracket is attached to the trailer.

16. The method of claim 15, wherein an angle of the angled face of the tool body matches an angle at which the second arm of each bracket is angled toward each respective chain slot when each bracket is attached to the underside of the trailer.

17. The method of claim 11, wherein the second arm of each bracket extends at an angle of greater than 90 degrees to about 110 degrees with respect to the first arm.

18. The method of claim 11, further comprising attaching each bracket adjacent each respective chain slot at a predetermined distance from each respective chain slot.

19. The method of claim 18, further comprising using an installation tool to position a respective bracket at the predetermined distance from the respective chain slot and to hold the bracket at the predetermined distance until the first arm of the bracket is attached to the underside of the trailer.

20. The method of claim 19, further comprising attaching a respective light to the mounting area of the respective bracket after attaching the first arm of the bracket to the underside of the trailer and after removing the installation tool from the bracket.

* * * * *